Jan. 3, 1967
T. H. GLEASON
3,295,420
HYDRAULIC ACTUATOR
Filed Dec. 14, 1964
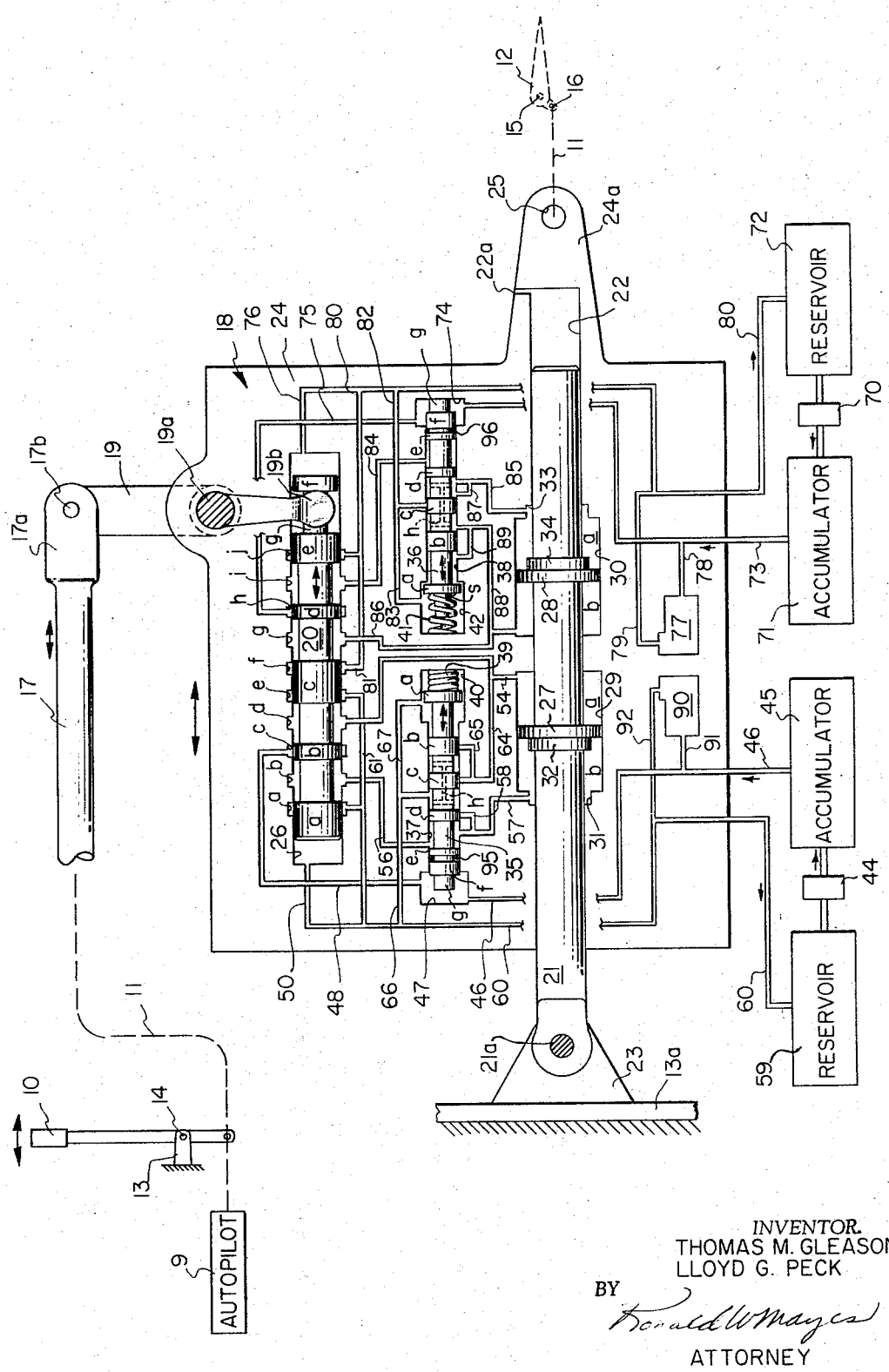
INVENTOR.
THOMAS M. GLEASON
LLOYD G. PECK
BY
*Ronald W. Mayers*
ATTORNEY

United States Patent Office 3,295,420
Patented Jan. 3, 1967

3,295,420
HYDRAULIC ACTUATOR
Thomas M. Gleason and Lloyd G. Peck, Wichita, Kans., assignors to The Boeing Company, Seattle, Wash., a corporation of Delaware
Filed Dec. 14, 1964, Ser. No. 418,137
7 Claims. (Cl. 91—216)

This invention relates to hydraulic actuator means. More particularly, this invention relates to hydraulic control means for aircraft responsive to both automatically and/or manually operable means for adjusting a flight control instrumentality.

The primary object of this invention is to provide novel manually and/or automatically controllable hydraulic control means for controlling an aircraft flight control instrumentality.

Another object of this invention is the provision of novel hydraulic control means for positioning an airfoil and for holding the same in position.

A further object of this invention is the provision of the hydraulic control system, as set forth in the preceding paragraph, having gust damping means.

Yet another object of this invention is the provision of novel hydraulic control means comprising two novel independent hydraulic systems having a housing traveling on a pair of interconnected double-acting pistons for positioning a member and for holding the member in position.

Another object of this invention is the provision of the hydraulic control means set forth in the preceding object further comprising bypass valve means for permitting one of the systems to be operated to drive one of the pistons while the other is not operating to drive the other of the pistons, the bypass valve means of the nonoperating piston being automatically operable to permit fluid to pass from one side of the nonoperating piston to the other side thereof.

A further object of this invention is the provision of novel hydraulic servo motor means for positioning a movable member and holding the member in place and comprising a housing adapted to travel along a double-acting piston and piston rod, and controlled by the positioning of self-nulling servo metering valve means.

More particularly this invention comprises an hydraulic actuator for powering and positioning an aircraft elevator responsive to movement of an aircraft control column by a pilot or autopilot. The hydraulic actuator has a housing that travels on a piston rod pivotally connected to an horizontal stabilizer. The housing is pivotally connected at a trailing end thereof to the elevator. The piston rod has a pair of double-acting pistons affixed thereto. A single servo valve simultaneously controls the flow of hydraulic fluid to corresponding sides of each of the two pistons for causing the housing to travel in a selected direction on the piston rod by movement of the servo valve off center from a nulled position. At the same time that the servo valve connects the one side of each of the pistons to the pressurized fluid, the opposite sides of the pistons are connected to the sump so that travel of the housing will not be blocked. Travel of the housing tends to null the servo valve by continuing to move until the servo valve is again in centered and nulled position in the housing. An important feature of the invention resides in the one servo valve controlling two parallel and substantially independent hydraulic systems, one system for operating each of the double-acting pistons. The two separate systems share a common housing, piston rod and servo valve.

A distinct advantage of such an arrangement is that each system assists and backs up the other. A by-pass valve is provided in each system to permit the piston of that system that may become inoperative to be freely driven by the other system. This is accomplished by the bypass valve being urged by a spring into a power off position when fluid pressure drops below a predetermined level and permitting the draining of fluid from the piston chamber of the inoperative system. The bypass valve in each system will be automatically driven against the biasing action of their respective springs to power on positions when the fluid pressure rises above the predetermined level.

The invention further resides in certain novel features of construction, combinations, and arrangements of parts and further objects and advantages of the invention will be apparent to those skilled in the art to which it pertains from the following description of the present preferred embodiment thereof described with reference to the accompanying drawing, which forms a part of this specification, and in which:

The drawing is a schematic illustration of a mechanism embodying the invention.

It is to be understood that the invention is not limited to the details of construction and arrangement of parts shown in the drawing and is capable of being otherwise embodied and of being practiced and carried out in various ways. It is to be further understood that the terminology employed herein is for the purpose of description and there is no intention to herein limit the invention beyond the requirements of the prior art.

Referring to the drawing, an autopilot device 9 and a pilot-operated control stick 10 are connected by a mechanical linkage 11 to a movable control surface 12 for the purpose of controlling the position thereof relative to an airframe 13. For purpose of illustration only, the control stick 10 is shown pivotally connected by a pin 14 to the airframe 13. The control surface 12 is, for purposes of illustration, an elevator adapted to be pivoted about a rod 15 by a crank arm 16. The arm 16 is pivotally connected to the linkage 11.

The linkage 11 includes a manually operated push-pull rod 17 connected to a double-acting, self-nulling hydraulic actuator, indicated generally by the reference numeral 18, by an actuator lever arm 19. The actuator lever arm 19 is pivotally connected to the rod 17 between a bifurcated or forked end 17a thereof by a pivot pin 17b and forms a control system input point. The arm 19 operates a servo control metering spool valve 20. The hydraulic actuator 18 has a piston rod 21 slideable in a cylindrical opening 22. The rod 21 is pivotally connected by a pivot pin 21a, forming a stabilizer structure attachment point, to a clevis-type bracket 23. The bracket 23 is preferably fixed to an horizontal stabilizer portion 13a of the airframe 13.

The piston rod 21 of the hydraulic actuator 18 is slideably disposed in a traveling body 24, which is schematically illustrated as a rectangular solid body shape. The piston rod is preferably cylindrical and slides in the cylindrical opening 22 formed in the body 24. The inner end of the opening 22 has an air vent hole 22a. The body 24 is provided with an elevator horn attachment arm 24a connected to the linkage 11 by a pivot pin 25.

The servo valve 20 is a spool valve slideably disposed in a cylindrical opening 26. The cylindrical opening 26 is provided with axially spaced recesses 26a, 26b, 26c, 26d, 26e, 26f, 26g, 26h, 26i and 26j formed therein. The recesses are preferably cylindrical. The valve 20 comprises cylindrical lands 20a, 20b, 20c, 20d, 20e and 20f. The land 20f is of slightly smaller diameter than the other lands 20a, 20b, 20c, 20d and 20e and is connected to the land 20e by an axially projecting connector rod 20g. The arm 19 is pivotally supported by trunnion arms 19a in the housing body 24. A forked end 19b of the arm 19 forming the lower end of the actuator arm 19 straddles the rod 20g and controls the position of the spool valve 20.

The piston rod 21 has two axially spaced cylindrical pistons 27 and 28 fixed thereto and respectively slideably disposed in cylinders 29 and 30 formed in the body 24 substantially parallel to the spool valve 20.

More particularly, the cylinder 29 has a smaller concentric cylindrical opening 31 adapted to receive a small cylindrical piston 32 in juxtaposition and contiguous with the piston 27 on the common piston rod 21 for providing a wind gust damper means. The piston 32 is adapted to be slideably received in the cylindrical opening 31 when the actuator body 24 is caused to be moved in a rearward direction so as to telescope the cylindrical opening 31 over the piston 32. Similarly, the cylinder 30 has a smaller cylindrical opening 33 at one end thereof for slideably receiving a cylindrical piston 34 in juxtaposition with and contiguous to the piston 28 coaxial with the common piston rod 21. As the actuator body 24 is moved forwardly of the aircraft, the cylindrical opening 33 is caused to be telescoped over and disposed about the piston 34 for operating as a wind gust damper, usually while the aircraft is parked with power off.

The actuator 18 additionally comprises a bypass valve 35 and another bypass valve 36. The bypass valves 35 and 36 are respectively shown in "power on" and "power off" positions for illustration purposes although the valves 35 and 36 are expected to normally assume the same positions of "on" or "off." The bypass valve 35 comprises lands 35a, 35b, 35c, 35d, 35e and 35f, and a cylindrical end stop 35g. Similarly, the bypass valve 36 comprises lands 36a, 36b, 36c, 36d, 36e and 36f, a cylindrical end stop 36g, and a frusto-conical helical spring guide 36s. The bypass valve 35 is slideably disposed in a cylindrical opening 37 formed in the actuator body 24 coaxial with a cylindrical opening 38 which slideably receives the bypass valve 36. Both of the bypass valves 35 and 36 have H-shaped internal passages 35h and 36h formed therein across the lands 35c and 36c, respectively.

A helical spring 39 has one end bearing against a bottom wall of a cup-shaped cylindrical opening 40. The opening 40 is formed at one end of and coaxial with the cylindrical opening 37. Another end of the spring 39 encircles a frusto-conical portion end, hidden by the spring 39, of the bypass valve 35 and abuts a radial shoulder of the land 35a thereof.

Another helical spring 41 is disposed within a cup-shaped cylindrical opening 42 formed at an interior end and coaxial with the cylindrical opening 38. One end of the helical spring 41 bears against an inner, bottom wall of the opening 42 and the other end is disposed about the frusto-conical spring guide portion 36s of the bypass valve 36 and bears against a shoulder or flat of the land 36a thereof. The springs 39 and 41 urge the bypass valves 35 and 36, respectively, axially outwardly away from each other in a fore and aft direction. The valves 35 and 36 are coaxially disposed. As pointed out, for purposes of illustration the bypass valves 35 and 36 are shown in two different operating positions although normally these valves 35 and 36 will have substantially the same position since they are independently operated in parallel systems.

Hydraulic fluid is supplied under pressure by a pump 44 to an accumulator 45, and from the accumulator 45 via an inlet line 46 to a cylindrical chamber 47. The chamber 47 is coaxially formed at one end of the cylindrical opening 37 occupied by the bypass valve 35. The "power off" position of the bypass valve 35 is caused by a failure of the pump 44 or a loss of pressure in the accumulator 45. The "power on" position of the valve 35 is assumed when the accumulator pressure is at a normal operating level.

The return line 60 is connected by a passage 50 to one end of the cylindrical opening 26 occupied by the servo valve 20. The passage 50 opens into a forward end of the cylindrical opening 26. A high pressure fluid line 48 opens into the cylindrical recess 26c and the chamber 47. The recess 26c is adapted to be closed by the servo valve land 20b when the servo valve 20 is in the central neutral position, as shown in the drawing.

It is only when the actuator body 24 has moved to the rear or to the right that high pressure hydraulic fluid can be provided by a passage 54 to the piston chamber 29a of the cylindrical opening 29. The passage 54 is connected to the cylindrical opening 26 by the cylindrical recess or groove 26d located between the lands 20b and 20c. In contradistinction thereto high pressure fluid can be provided to a chamber 29b of the cylindrical opening 29 by a passage 56 and a passage 57, when the actuator housing 24 has moved to the left or in a forward direction relative to the servo valve 20. The passage 56 has its beginning in the cylindrical recess or groove 26b located between the lands 20a and 20b of the servo valve 20. The other end of the passage 56 opens into the bypass valve opening 37 between the lands 35d and 35e of the bypass valve 35. The passage 57 has one end opening into the cylindrical recess 31 with the other end opening into the recess 37 between the lands 35d and 35e. A branch passage 58 opens between lands 35c and 35d when the bypass valve 35 is moved to the left into the "power off" position by the spring 39. The branch passage 58 is blocked by the land 35d when the fluid pressure in the chamber 47 has caused the bypass valve 35 to compress the spring 39, as shown, in the "power on" position.

The bypass valve 35 performs a function of controlling and permitting the bypassing of pressure fluid from the accumulator 45 and the passage 54 back to a reservoir or sump 59 for the pump 44 by a return line 60 when hydraulic power is off only. The spool valve 20 controls the shifting of the body 24 on the piston rod 21 although fluid is routed through and past the bypass valve when in "power on" position.

The return line 60 has a tributary branch line 61. More particularly, high pressure fluid is bled from the cylindrical opening 26 by a pair of lines 60 and 61 in addition to the line 50, the line 61 being connected to the passage 60 near the upper end thereof. The passage 60 opens into the enlarged cylindrical recess 26a formed in the cylindrical opening 26. Normally the recess 26a is closed by the land 20a when the servo valve 20 is in centered neutral or nulled position. When the servo valve 20 has been caused to move to the left end of the opening 26 by the aft movement of the housing body 24, the passage 60 is opened and connected to the high pressure line 56. However, the land 26a blocks off the passage 60 when the servo valve 20 moves to the right end of the opening 26 which is caused by the forward movement by the traveling actuator body 24.

The fluid return passage 61 is blocked by the land 20c when the servo valve 20 is in centered neutral position. But the passage 61 is opened to the high pressure line 54 for bleeding the same when the servo valve 20 is moved to the right-hand end of the cylindrical opening 26 by the lever arm 19 and/or caused by the self-nulling forward movement of the traveling actuator body 24.

The passage 54 is connected directly to the cylindrical opening 37, in which the bypass valve 35 is slideably disposed, by means of a branch or bypass passage 64 that bifurcates and forms a sub-branch passage 65 and opens into the opening 37. The passage 64 connects the line 54, as well as the chamber 29a, to the return relief line 60 by a relief line 66 that opens into the opening 37 between the bypass valve lands 35c and 35d. It is noteworthy that both of the high pressure passages 64 and 65 are blocked by the lands 35c and 35b, respectively, when the bypass valve has compressed the spring 39 in the "power on" position. However, when the bypass valve 35 has been shifted forwardly to the left into the "power off" position, the passages 64 and 65, respectively, open into the recesses between the lands 35b and 35c, and 35a and 35b for permitting fluid to drain from the chamber 29a. An additional relief passage 67 connects into the line 66 at one end thereof and into the enlarged recess 40 at the other end thereof. The end of the line 67 opening into the recess 40 is never blocked by the land 35a of the bypass valve 35. The land 35a serves as a stop when the valve 35 is in "power off" position. As a matter of desirability and for more accurate control of the extreme positions of the bypass valve 35, the extra land 35f is provided at the left end of the bypass valve 35 and a cylindrical end stop 35g is fixed to the extreme left end for butting against an opposed wall formed by the opening 47.

The bypass valve 35 in the "power off" position, on movement of the servo valve 20 from neutral, will immediately respond to the initial inlet line pressure drop and be forced into "power off" position by the spring 39. This will permit hydraulic fluid to flow from one side of the piston 27 as fluid is fed to the other side thereof, depending on which way the servo valve 20 has been shifted by the control rod 19. The flow of fluid will continue until the housing body 24 has traveled to the nulling position up to the full distance permitted by the pistons 27 and 28 or so long as the servo valve 20 is held off center away from the nulled position by the control rod 19. Just as soon as one of the foregoing conditions has been achieved, fluid pressure again builds up in the inlet line 46 and forces the bypass valve 35 back to its normal "power on" position. "Power on" means that the actuator 18 will transmit actuating movement to operate the control surface 12. "Power off" means the pistons 27 and/or 28 are trapped in a given cylinder position relative to the body 24 and no actuating movement is transmitted to the control surface 12 due to the fluid being trapped and unable to flow from either side of the pistons 27 and 28.

It is noteworthy that the servo valve 20 can be moved in one direction by the rod 19 or held stationary by the rod 19 while the body 24 travels in a short arc about the pivot axis, defined by the trunnions 19a, in an opposite and nulling direction. Preferably the travel of the servo valve 20 is on the order of ⅛ to ¼ inch. The self-nulling travel of the body 24 operates to cause a decrease in the travel of the servo valve 20 from its neutral position unless accompanied by a compensating increment of travel by the rod 19. For example, on the aft movement of the linkage 11, the servo valve 20 is moved to the left or forwardly, but the body 24 will move aft or to the rear for tilting the control surface 12 upwardly in a counterclockwise direction about its pivot axis 15. In other words, the hydraulic actuator 18 is automatically self-nulling. Self-nulling can only be prevented by continuous operation of the control stick 10.

The operation of only one of the two independent servo systems housed in the actuator 18 has been described. The other parallel system controls the flow of fluid to and from portions a and b of the chamber 30 occupied by the piston 28. Though one servo valve 20 operates both systems, the servo valve 20 functionally comprises two servo valves integrally connected together in side-by-side relationship.

An hydraulic pump 70 supplies fluid to an accumulator 71 from a reservoir or sump 72 via a high pressure inlet line 73 to a cup-shaped opening 74 occupied by the bypass valve end stop 36g, then via a feed line 76 to the inlet groove 26h formed in the servo valve opening 26. A thermal bleed valve 77 operates as a pressure regulator for the line 73 and is connected thereto by a line 78 and to a sump return line 79 by a line 80. The sump return line 80 is connected to the servo valve opening groove 26j at the inlet end thereof. The right or aft end of the valve opening 26 is connected to the return line 80 by a line 76.

A tributary return line 81 connects the servo valve groove 26f into the return line 80. Another tributary return line 82 connects the bypass valve opening 38 as controlled by the valve land 36c into the return line 80. Another tributary return line 83 connects the bypass valve opening 42 into the return line 80 via the line 82.

Pressure fluid is supplied to the chambers 30a or 30b by feed lines 84, 85 or 86 as controlled by the servo valve land 20d. The line 86 has its inlet end connected to the servo valve opening groove 26g and its outlet end connected to the chamber 30b of the piston 28. The bypass valve land 36d controls the flow of pressure fluid to the chamber 30a via the feed lines 84 and 85. The inlet end of the feed line 84 is connected to the servo valve opening groove 26i and empties into the bypass valve opening 38 as controlled by the land 36d. The feed line 85 has its inlet end connected into the opening 38 as controlled by the bypass valve land 36d. The outlet end of the line 85 is connected into the opening 33 and controlled by the wind gust buffer or damper piston 34 fixed to the piston 28 and the piston rod 21.

When the bypass valve 36 is in the "power off" position, fluid can escape from the chamber 30a only by the line 85 and a branch relief line 87 to the main return line 80 via the return line 82 as controlled by the bypass valve land 36c. The exodus of fluid from the chamber 30b during "power off" must be through the pressure inlet line 86 and to the return lines 82 and 80 via a branch line 88 and the passage 36h in the bypass valve 36. The inlet end of the line 88 is connected into the high pressure fluid feed line 86. The outlet end of the line 88 is connected to the line 82 via the opening 38 as controlled by the bypass valve land 36c. A branch line 89 bleeds fluid from the line 88 into the return lines 83 and 82 via the bypass valve opening 38 between the valve lands 36a and 36b past the large land 36a. Fluid pressure drop in the chamber 74 permits the spring 41 to power the valve 36 to a "power off" position. In the "power on" position, the valve 36 permits high pressure fluid to enter the chamber 30a but the escape of fluid from the chamber 30b past the valve 36 is blocked by the lands 36b and 36c as soon as the valve 36 is moved to the extreme left. However fluid can escape from the chamber 30b through lines 86, 81 and 80 back into the reservoir 72 when the servo 20 is moved to the left.

Should one of the two pumps 44 or 70 fail, the actuator 18 remains in operation due to the automatic operation of the bypass valves 35 and 36. Should the pump 70 fail, the body 24 will be powered by the pump 44 and fluid will escape from the chamber 30b by the lines 86, 88, 89, 36h, 83, 82 and 80 back into the sump 72 after the valve 36 has been driven into the "power off" position by the spring 41. Fluid can also escape from the chamber 30a under like conditions to the sump 72 via lines 85, 87, 36h, 82 and 80 after the valve 36 has been driven to the left to "power off" position.

Likewise, should the pump 44 fail, fluid can escape from the chamber 29a via the lines 54, 64, 65, 35h, 67, 66 and 60 into the sump 59 as soon as the bypass valve 35 has been driven to the "power off" position by the spring 39. Fluid can escape from the chamber 29b via the lines 57, 58, 36h, 66 and 60 into the sump 59.

If desired a thermal bleed valve 90, similar to the thermal bleed valve 77, can have its intake end connected into the high pressure line 46 and its exhaust end connected to the return line 60 by the lines 91 and 92, respectively. The thermal bypass valves 77 and 90 are for the purpose of providing heat to the actuator body 24 by heating the hydraulic fluid when the same drops below a predetermined value. The thermal bypass valves 77 and 90 are thermostatically controlled by self-contained thermostats which regulate the flow there-past. Flow through the thermal bypass valves 77 and 90 is shut off when the temperature of the body 24 is above the predetermined level.

Another feature of this invention is the provision of O-rings 95 and 96 disposed in grooves formed between the lands 35e and 35f, and 36e and 36f, respectively, of the bypass valves 35 and 36.

It will be understood that this invention can be modified to adapt it to various circumstances and conditions, and it is accordingly desired to comprehend within the purview of this invention such modifications as may be considered to fall within the scope of the appended claims.

What is claimed is:

1. An hydraulic control system for an aircraft having a control surface comprising, traveling hydraulic actuator means having first, second and third cylinder means formed therein, a piston slideably disposed in said first cylinder means, a piston rod affixed to said piston and pivotally connected to the aircraft, a member pivotally connected to the control surface, spool servo valve means slideably disposed in said second cylinder means, pilot-actuatable means connected to said servo valve means for displacing the same in said second cylinder means, cylinder bypass valve means slideably disposed in said third cylinder means for bypassing fluid from said first cylinder means when said bypass valve means is in a power off bypass position and preventing said piston from being hydraulically locked in place in said first cylinder means, spring means biasing said bypass valve means in one direction into the power off position in said third cylinder means, first conduit means conducting fluid under pressure to one end of said bypass valve means and compressing said spring means and urging said bypass valve means into a piston actuating power on position, second conduit relieving fluid under pressure from another end of said bypass valve means and from said first cylinder means on one side of said piston means as controlled by the axial position of said bypass valve means, and third conduit means supplying fluid under pressure from a pressure fluid supply to one end of said servo valve means and to said first cylinder means on an opposite side of said piston means as controlled by the axial positioning of said servo valve means and said bypass valve means, said bypass valve means being automatically axially shifted into the power off bypass position to trap hydraulic fluid in said first cylinder means on both sides of said piston when said servo valve means is returned to center by said pilot-actuatable means for holding said control surface in the position selected, and said bypass valve means permitting full hydraulic power to continue to bear against said other side of said piston when said piston has reached the end of travel thereof in said first cylinder means so long as said servo valve means is held off-center by said pilot-actuatable means.

2. An hydraulic control system for an aircraft as set forth in claim 1, wherein said pilot-actuatable means includes a control input shaft pivotally connected to said traveling hydraulic actuator means in such a manner that said traveling hydraulic actuator means pivots about a point on said control input shaft in a plane defined by the longitudinal axis of said control input shaft and the longitudinal axis of said piston rod.

3. Hydraulic actuator means comprising, a housing having first, second and third cylinder means formed therein, a piston slideably disposed in said first cylinder means, a piston rod affixed to said piston, servo valve means slideably disposed in said second cylinder means, actuating means connected to said servo valve means for displacing the same in said second cylinder means, cylinder bypass valve means slideably disposed in said third cylinder means, means biasing said bypass valve means to bypass position in said third cylinder means, first conduit means for conducting fluid under pressure to said bypass valve means and biasing said bypass valve means against said biasing means into piston actuating position, second conduit means for relieving fluid under pressure from said bypass valve means and from said first cylinder means on one side of said piston means as controlled by said bypass valve means, and third conduit means for supplying fluid under pressure from said fluid supply to said servo valve means and to said first cylinder means on an opposite side of said piston means as controlled by said servo valve means and said bypass valve means, said servo valve means being automatically axially shiftable in a direction relative to said housing to trap hydraulic fluid in said first cylinder means on both sides of said piston when said servo valve means is returned to center and nulled by said actuating means for holding the position of said piston in said first cylinder means, and said bypass valve means being adapted to permit full hydraulic power to continue to bear against said other side of said piston when said piston has reached the end of travel thereof in said first cylinder means so long as said servo valve means is held off-center by said actuating means.

4. An hydraulic actuator as set forth in claim 3, wherein said actuating means includes control input means pivotally connected to said housing.

5. An hydraulic actuator for an aircraft having a control surface comprising, traveling hydraulic actuator housing means having first and second cylinder means formed therein, a piston slideably disposed in said first cylinder means, a piston rod affixed to said piston and connected to the aircraft, said housing means being connected to the control surface, servo valve means disposed in said second cylinder means, pilot-actuatable means connected to said servo valve means for displacing the same in said second cylinder means, cylinder bypass valve means in said housing means, spring means biasing said bypass valve means into a power off position in said housing means when the fluid pressure falls below a predetermined level, first conduit means conducting fluid under pressure to said bypass valve means and normally compressing said spring means and biasing said bypass valve means into a power on position, second conduit means draining fluid from said bypass valve means and from said first cylinder means on both sides of said piston means when said bypass valve means is in the power off position, third conduit means supplying fluid under pressure to said first cylinder means on one side of said piston means said servo valve means is moved in one direction and said bypass valve means is in a power on position, said servo valve means being automatically axially shifted in a self-nulling direction to trap hydraulic fluid in said first cylinder means, and said servo valve means permitting full hydraulic power to continue to bear against said one side of said piston when said piston has reached the end of travel thereof in said first cylinder means so long as said servo valve means is held off-center by said pilot-actuatable means in said one direction.

6. An hydraulic actuator for effecting movement of a control surface relative to an airframe comprising, housing means having a chamber formed therein, a double-acting piston slideably disposed in said chamber, said chamber of said housing means, first conduit means for connecting said chamber to a source of pressurized fluid, a control valve for controlling the flow of the pressurized fluid into said housing means and against a selected one side of said piston for adjusting the position of said piston in said chamber, said piston having one end extending externally of said housing means and connected to the airframe, said housing means being connected to the control surface for adjusting the position thereof relative to the airframe, pilot-operated control linkage connected to said control valve for operating the same, and a two-position bypass valve means disposed in said housing means for permitting the drain of hydraulic fluid from said housing means and said chamber of said piston into a sump when in a power off position due to a drop in fluid pressure below a predetermined level and for preventing the drain of pressurized fluid from said piston chamber when in a power on position when the fluid pressure is above a predetermined level; said pilot-operated control linkage comprising a control input shaft pivotally connected to said housing means in such a manner that said housing means pivots about a point on said control input shaft in a plane defined by the longitudinal axis of said control input shaft and the longitudinal axis of said piston rod.

7. An hydraulic control system for an aircraft having a control surface comprising, traveling hydraulic actuator housing means having first, second and third cylinder means formed therein, a double-acting piston slideably disposed in said first cylinder means, a piston rod affixed to said piston and pivotally connected to the aircraft, said housing means being pivotally connected to the control surface, spool servo valve means slideably disposed in said second cylinder means, pilot-actuatable means connected to said spool servo valve means for positioning the same in said second cylinder means, cylinder bypass spool valve means slideably disposed in said third cylinder means, spring means biasing said bypass valve means into a power off direction in said third cylinder means when fluid pressure falls below a predetermined level, first conduit means conducting fluid under pressure to said bypass valve means and normally biasing the same into a power on position and compressing said spring means, second conduit means draining fluid from said first cylinder means when said bypass valve means is in a power off position, third conduit means supplying fluid under pressure via said servo valve means to said first cylinder means to a selected side of said piston means as controlled by the axial position of said servo valve means when said bypass valve means is in the power on position and said servo valve means controlling the draining of fluid from the other side of said piston means while fluid is being supplied to said one side of said piston means, said servo valve means being automatically axially shifted in a self-nulling direction to trap hydraulic fluid in said first cylinder means on both sides of said piston by the travel of said actuator housing, and said servo valve means permitting full hydraulic power to continue to bear against a selected side of said piston and said piston has reached the end of travel thereof in said first cylinder means so long as said servo valve means is held off-center by said pilot-actuatable means.

References Cited by the Examiner
UNITED STATES PATENTS

| | | | |
|---|---|---|---|
| 2,826,896 | 3/1958 | Glaze et al. | 91—216 |
| 2,990,145 | 6/1961 | Hougland | 91—363 |
| 3,190,185 | 6/1965 | Rasmussen | 91—411 |
| 3,240,124 | 3/1966 | Howard | 91—216 |

EDGAR W. GEOGHEGAN, *Primary Examiner.*

PAUL E. MASLOUSKY, *Examiner.*